United States Patent
Gill et al.

(10) Patent No.: US 8,526,326 B1
(45) Date of Patent: Sep. 3, 2013

(54) LOCK-LESS ACCESS OF PRE-ALLOCATED MEMORY BUFFERS USED BY A NETWORK DEVICE

(75) Inventors: Monty S. Gill, San Jose, CA (US); Yi Sun, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 591 days.

(21) Appl. No.: 12/199,556

(22) Filed: Aug. 27, 2008

(51) Int. Cl.
*H04L 12/28* (2006.01)

(52) U.S. Cl.
USPC ............ 370/254; 370/412; 711/150; 711/154

(58) Field of Classification Search
None
See application file for complete search history.

(56) References Cited

U.S. PATENT DOCUMENTS

| | | | | |
|---|---|---|---|---|
| 4,847,754 A * | 7/1989 | Obermarck et al. | ......... | 718/104 |
| 5,652,714 A * | 7/1997 | Peterson et al. | ............... | 702/57 |
| 5,860,149 A * | 1/1999 | Fiacco et al. | ................. | 711/209 |
| 6,389,513 B1 * | 5/2002 | Closson | ....................... | 711/129 |
| 7,016,367 B1 * | 3/2006 | Dyckerhoff et al. | ......... | 370/429 |
| 7,032,088 B2 * | 4/2006 | Paladini et al. | ............... | 711/158 |
| 2002/0016900 A1 * | 2/2002 | Miller | .......................... | 711/220 |
| 2002/0059165 A1 * | 5/2002 | Hersh et al. | ....................... | 707/1 |
| 2004/0040018 A1 * | 2/2004 | Fleming et al. | ............... | 717/162 |
| 2006/0156030 A1 * | 7/2006 | Saika | ............................ | 713/188 |
| 2006/0161737 A1 * | 7/2006 | Martin et al. | ................. | 711/147 |
| 2006/0259572 A1 * | 11/2006 | Brown | ........................... | 709/213 |

OTHER PUBLICATIONS

"Implementing a Memory-Based Mutex and Barrier Synchronization Library,9" Application Note, Doc. No. AN07-092-00, Tensilica, Inc., Jul. 2007, 10 pgs.

* cited by examiner

*Primary Examiner* — Gregory Sefcheck
*Assistant Examiner* — Daniel Mitchell
(74) *Attorney, Agent, or Firm* — Shumaker & Sieffert, P.A.

(57) ABSTRACT

In general, the present disclosure describes techniques for both removing memory buffers from and adding memory buffers to a list (e.g., a linked list) of available buffers, for use by a network device, without locking the list during access. One example method includes allocating a list of memory buffers that are each available for use by multiple modules executed within the network device, wherein the list includes a first end and a second, opposite end, and removing a first memory buffer from the first end of the list by a first module of the multiple modules without locking the list. The method further includes adding the first memory buffer to the second end of the list by a second module of the multiple modules without locking the list.

28 Claims, 9 Drawing Sheets

LOCK-LESS ACCESS OF PRE-ALLOCATED MEMORY BUFFERS USED BY A NETWORK DEVICE

TECHNICAL FIELD

The present invention generally relates to the use of memory buffers during the processing of data by a network device, such as a router.

BACKGROUND

In communications across a network, various network devices may monitor or control the flow of data packets that are sent from one device to another. For example, a router or a firewall may actively monitor incoming data packets that are sent from a first user device (e.g., computing device) to a second user device. The router or firewall may, in some instances, scan these incoming data packets for viruses. If any viruses are detected, the router or firewall may temporarily or permanently block further incoming traffic that is received from the first user device.

In some cases, the network device may process and/or store data packets using available memory buffers that are allocated by the network device. These available memory buffers may be included within a "free list" of buffers. During data processing, multiple processes, or multiple threads of execution, may need to access the "free list" of buffers over time. For example, these processes may need to remove available buffers from, or add available buffers to, the "free list" when processing data. Because multiple different processes may access the list, it is possible that two or more processes may attempt to access the list at substantially the same time. In order to avoid any such conflict, each process typically needs to lock the list during access, and then subsequently unlock the list. Any other processes are unable to access the list while it is locked.

SUMMARY

In general, the present disclosure describes techniques for both removing memory buffers from and adding memory buffers to a list of available buffers, for use by a network device, without locking the list during access. For example, in some cases, two modules (e.g., two processes, two threads of execution) may manipulate memory buffers within a "free list" of available buffers without locking the list, which may comprise a linked list. In one example, one process may either add buffers to or remove buffers from the head of the list, while the other process may either add buffers to or remove buffers from the tail of the list, thereby avoiding the need to lock the list. These buffers may comprise pre-allocated memory buffers within the list. The two processes of this example may be capable, in certain cases, of simultaneously accessing the list. Because the list does not necessarily need to be locked during access, these two processes may be executed with higher performance.

In one embodiment, a method comprises allocating a list of memory buffers that are each available for use by multiple modules executed within the network device, wherein the list includes a first end and a second, opposite end, and removing a first memory buffer from the first end of the list by a first module of the multiple modules without locking the list. The method further includes adding the first memory buffer to the second end of the list by a second module of the multiple modules without locking the list.

In one embodiment, a computer-readable medium comprises instructions that cause one or more processors to allocate a list of memory buffers that are each available for use by multiple modules executed within the network device, wherein the list includes a first end and a second, opposite end, to remove a first memory buffer from the first end of the list by a first module of the multiple modules without locking the list, and to add the first memory buffer to the second end of the list by a second module of the multiple modules without locking the list.

In one embodiment, a network device comprises a memory, a first module, and a second module. The first and second modules are part of a group of multiple modules. The memory is configured to store a pre-allocated list of memory buffers that are each available for use by multiple modules of the network device, wherein the list includes a first end and a second, opposite end. The first module is configured to remove a first memory buffer from the first end of the list without locking the list. The second module is configured to add the first memory buffer to the second end of the list without locking the list.

The details of one or more embodiments of the invention are set forth in the accompanying drawings and the description below. Other features, objects, and advantages will be apparent from the description and drawings, and from the claims.

DETAILED DESCRIPTION

Figure 1:
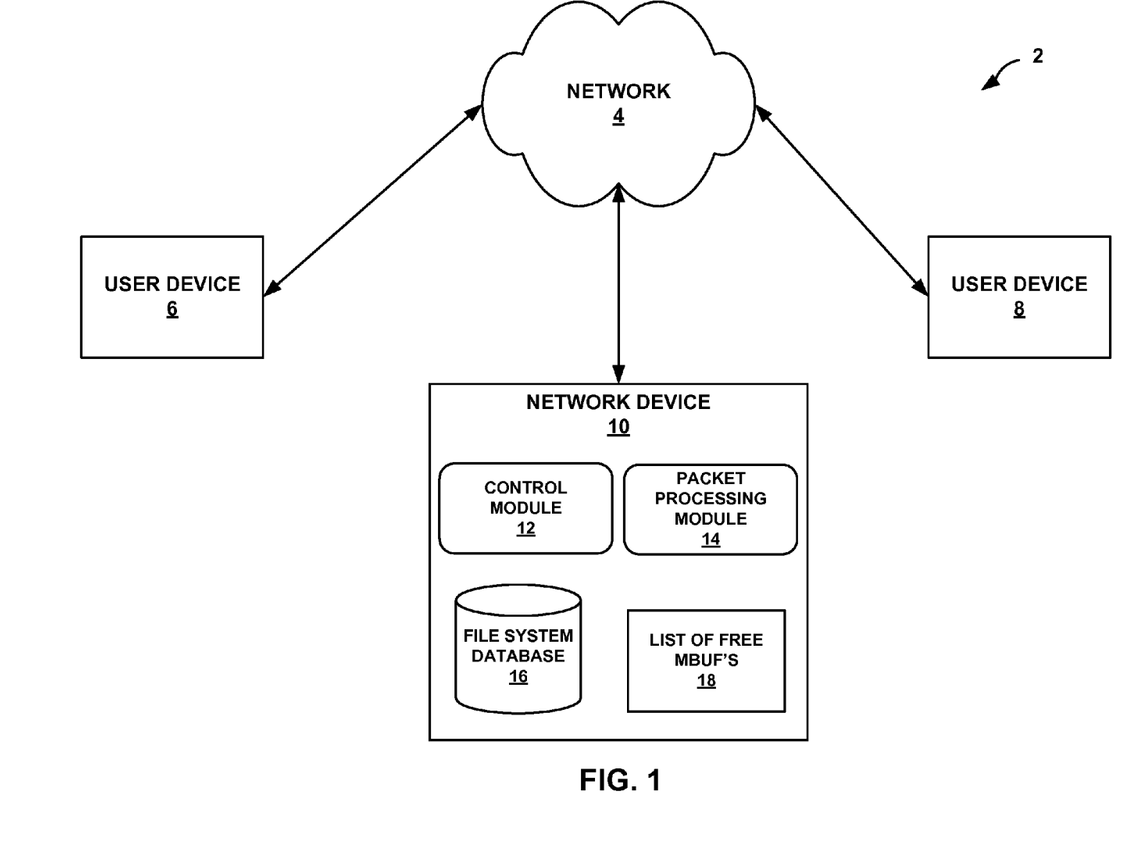
FIG. 1 is a block diagram illustrating a network device in a communication system that uses a list of free memory buffers when processing data, according to one embodiment.

FIG. 1 is a block diagram illustrating a network device 10 in a communication system 2 that uses a list of free memory buffers 18 when processing data, according to one embodiment. Communication system 2 includes a network 4, a user device 6, a user device 8, and network device 10. User device 6, user device 8, and network device 10 are each coupled to network 4, and may communicate with each other via network 4. When processing data within communication system 2, network device 10 is capable of manipulating the list of free memory buffers 18. In some embodiments, two modules (such as two processes or two threads of execution) of multiple modules within network device 10 are capable of manipulating the list of free memory buffers 18 without locking the list. In these embodiments, the two modules would, in certain scenarios, be capable of simultaneously accessing the list of free memory buffers 18. Because list 18 does not necessarily need to be locked during access, modules executed by network device 10 that access list 18 may have higher performance.

In some embodiments, network 4 may comprise a private or a public network (e.g., the Internet). In some embodiments, network 4 may comprise a wired or a wireless network. User devices 6 and 8 may each comprise a computing device that may be operated by a user, such as a human user. Although FIG. 1 shows two user devices 6, 8 coupled to network 4, any number of user devices may be coupled to network 4 in various different embodiments.

Network device 10 may, in some embodiments, monitor and/or control the communication flow between user device 6 and 8. For example, in some embodiments, network device 10 may comprise a router and/or a firewall. Network device 10 may help route data between user device 6 and user device 8, and may, in some cases, monitor certain communications between user device 6 and user device 8.

For example, if network device 10 includes a firewall, network device 10 may monitor data packets that are sent from user device 6 to user device 8, and/or monitor data packets that are sent from user device 8 to user device 6. If network device 10 determines, for example, that certain data packets are infected by one or more viruses, network device 10 may drop these packets or even block subsequent data communications from one or both of user devices 6 or 8.

Network device 10, as shown in the example of FIG. 1, includes a control module 12, a packet processing module 14, a file system database 16, and the list of free memory buffers 18. Control module 12 is capable of routing, or forwarding, data packets between user devices 6 and 8 according to one or more rules, or policies. Control module 12 is also capable of scanning data packets for viruses according to the one or more rules, or policies. Packet processing module 14 is capable of processing data packets in real time. For example, packet processing module 14 may process data packets that are received from user device 6. Control module 12 may determine how, or whether, to route the packets to user device 8 according to the one or more rules, or policies. Control module 12 and packet processing module 14 may each comprise an executed process.

Control module 12 may store information in, or extract information from, file system database 16. In some cases, incoming data packets may be temporarily stored in file system database 16 for later use or inspection. For example, packet processing module 14 may receive incoming data packets sent from user device 6 or user device 8 in real time, and control module 12 may temporarily store one or more of these packets in file system database 16. Control module 12 may then subsequently inspect these packets for routing purposes. In some cases, control module 12 may inspect the packets for viruses.

Packet processing module 14 and control module 12 may also access the list of free memory buffers 18 when processing or inspecting data packets. List 18 includes a pre-allocated list of memory buffers that are available for use by either or both of packet processing module 14 and control module 12. Each memory buffer may be used by packet processing module 14 or control module 12 to store one or more data packets. For example, packet processing module 14 may receive an incoming data packet from user device 6, and remove one of the available memory buffers in list 18 to store the data packet. After the data packet contained in the memory buffer has been processed or stored, the memory buffer may then again be added the list 18 of available memory buffers for use by control module 12 and/or packet processing module 14. In some embodiments, any two selected modules of multiple modules that may be contained within network device 10, such as control module 12 and packet processing module 14, are capable of accessing list 18. In these embodiments, any other modules besides these selected two modules within network device 10 do not have access to list 18.

In some embodiments, list 18 comprises a linked list, such as a doubly linked list of memory buffers. List 18 includes a first end (e.g., head) and a second, opposite end (e.g., tail). In these embodiments, packet processing module 14 may remove available memory buffers from, or add available memory buffers back to, the first end of list 18. Control module 12 may remove available memory buffers from, or add available memory buffers back to, the second, opposite end of list 18. Because packet processing module 14 and control module 12 manipulate memory buffers from opposite ends of list 18, they do not necessarily need to lock the instructions to add items to or remove items from the list 18 during access. Similarly, if necessary, packet processing module 14 and control module 12 are capable of simultaneously accessing opposite ends of list 18, in some scenarios. Because packet processing module 14 and control module 12 may not need to lock list 18 during access, these modules are capable of being executed by network device 10 with higher performance.

Figure 2:
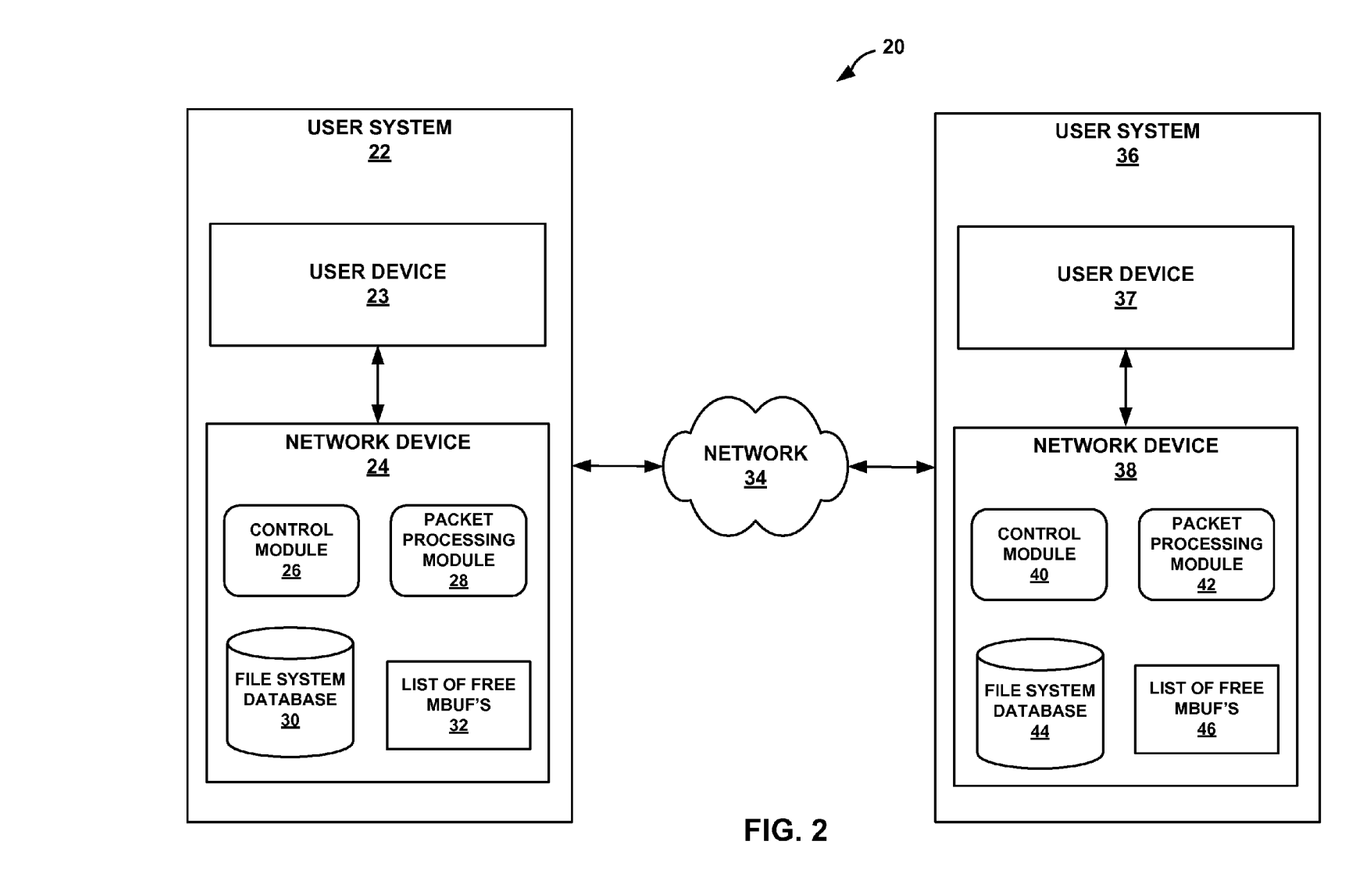
FIG. 2 is a block diagram illustrating multiple user systems in a communication system that each includes a network device and a user device, according to one embodiment.

FIG. 2 is a block diagram illustrating multiple user systems 22 and 36 in a communication system 20 that each includes a network device and a user device, according to one embodiment. As shown in FIG. 2, user system 22 includes a network device 24 and a user device 23, and user system 36 includes a network device 38 and a user device 37. In communication system 20, user systems 22 and 36 may communicate via network 34. Network 34 may be similar to network 4 shown in FIG. 1; user devices 23 and 37 may be similar to user devices 6 and 8 shown in FIG. 1; and network devices 24 and 38 may be similar to network device 10 shown in FIG. 1. Each user device within a user system is coupled to a corresponding network device, which may comprise a firewall device and/or a routing device. For example, user device 23 in user system 22 is coupled to network device 24, and user device 37 in user system 36 is coupled to network device 38.

Similar to network device 10 of FIG. 1, network device 24 includes a control module 26, a packet processing module 28, a file system database 30, and a list of free memory buffers 32. Likewise, network device 38 includes a control module 40, a packet processing module 42, a file system database 44, and a list of free memory buffers 46. List 32 and list 46 may each, in some cases, comprise a linked list, such as a doubly linked list. Network device 24 may allocate list 32, which includes a first end and a second, opposite end. Packet processing module 28 may remove available memory buffers from, or add available memory buffers back to, the first end of list 32. Control module 26 may remove available memory buffers from, or add available memory buffers back to, the second, opposite end of list 32. Because packet processing module 28 and control module 26 manipulate memory buffers from opposite ends of list 32, they do not necessarily need to lock the instructions to add items to or remove items from list 32.

Similarly, network device 38 may allocate list 46, which includes a first end and a second, opposite end. Packet processing module 42 may remove available memory buffers from, or add available memory buffers back to, the first end of list 46. Control module 40 may remove available memory buffers from, or add available memory buffers back to, the second, opposite end of list 46. Because packet processing module 42 and control module 40 manipulate memory buffers from opposite ends of list 46, they do not necessarily need to lock list 46 during access.

Figure 3:
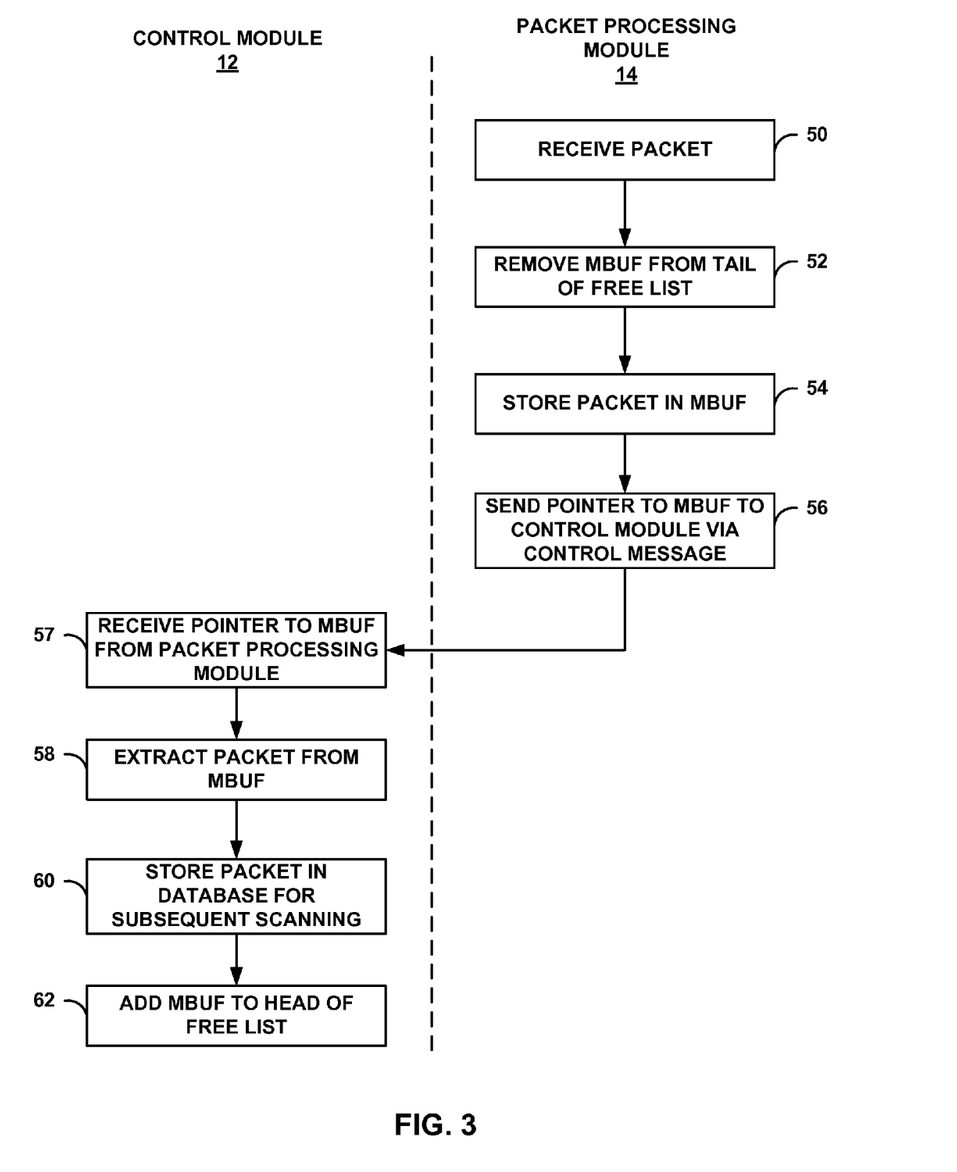
FIGS. 3-4 are flow diagrams illustrating various examples of data flow between a packet processing module and a control module of a network device, such as the network device shown in FIG. 1 or the network devices shown in FIG. 2, according to one embodiment.
Figure 4:
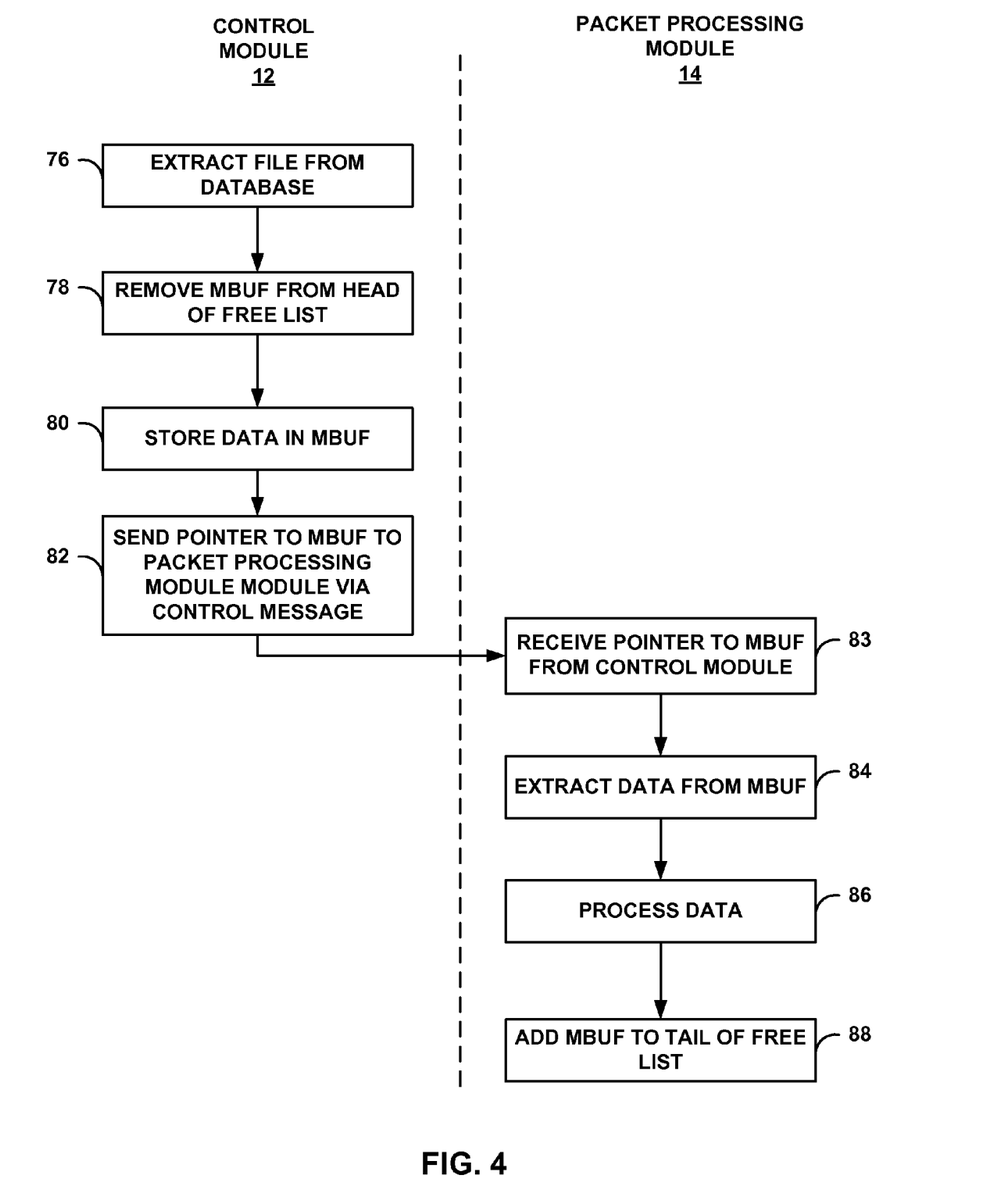

FIGS. 3-4 are flow diagrams illustrating various examples of data flow between a packet processing module and a control module of a network device, such as network device 10 shown in FIG. 1 or the network devices 24 or 38 shown in FIG. 2, according to one embodiment. For purposes of illustration only, FIGS. 3-4 assume that the data flow is between packet processing module 14 and control module 12 of network device 10.

Although packet processing module 14 and control module 12 are part of the same device (i.e., network device 10), they are capable of performing individual and separate functions within network device 10. At the same time, packet processing module 14 and control module 12 are capable of working together, and exchanging information, to achieve overall functions that are performed by network device 10, such as packet processing, scanning, and forwarding.

Each of packet processing module 14 and control module 12 may include one or more executable processes that are executed during data processing. These modules are capable of interacting with each other and exchanging information. Packet processing module 14 is capable of processing incoming packet data in real time, such as packet data received from user device 6 or 8. Control module 12 is capable of making determinations about forwarding such packets to one or more destinations, such as to user device 6 or 8.

As shown in the flow diagram of FIG. 3, packet processing module 14 may first receive a packet from one of user device 6 or 8 (50). Upon receipt of the packet, packet processing module 14 may store the packet for subsequent processing or scanning. In many cases, packet processing module 14 comprises a real-time thread that processes information on a real-time basis. Thus, in these cases, packet processing module 14 may handle the processing of incoming and/or outgoing data, but may allow other modules, such control module 12, to substantively analyze the data.

In order to store the received packet, packet processing module 14 may remove one memory buffer from the list of free, available memory buffers 18 (52). It is assumed that network device 10 has previously allocated a determined number of memory buffers within list 18 for use both by packet processing module 14 and control module 12. As described previously, both packet processing module 14 and control module 12 are capable of accessing list 18 without necessarily locking list 18 during such access. To achieve this, packet processing module 14 and control module 12 may manipulate memory buffers from opposite ends of list 18. Thus, in the example shown in FIG. 3, packet processing module 14 may remove an available memory buffer from the tail end of list 18.

Once packet processing module 14 has removed the memory buffer from the tail end of list 18, it may then store the packet within this memory buffer (54). Packet processing module 14 may then send a pointer, or a reference, to this memory buffer to control module 12 via a control message (56). Various different communication mechanisms or protocols may be use to send such a control message, or to exchange control messages, in network device 10.

Upon receipt of the pointer from packet processing module 14 (57), control module 12 may locate the memory buffer and extract the packet from this memory buffer (58). Control module 12 may then directly process the packet, and determine whether or not to forward it to a destination (such as to one of user devices 6 or 8), or may also store the packet in file system database 16 for subsequent processing (60). Once the packet has been processed and/or stored, the memory buffer is once again available for use. Thus, control module 12 may add the memory buffer back to list 18, such that it may be used by control module 12 or packet processing module 14 for subsequent operations (62). Control module 12 may add the memory buffer to the head of list 18, which is the opposite end of list 18 from which the memory buffer had been previously removed by packet processing module 14. Because packet processing module 14 and control module 12 access opposite ends of list 18, they are both capable of accessing list 18 without necessarily locking list 18.

FIG. 4 is a flow diagram illustrating an example data flow between control module 12 and packet processing module 14. In the example of FIG. 4, it is assumed that that a file now stored in file system database 16 has been scanned by control module 12. Thus, in FIG. 4, control module 12 may extract the file from file system database 16 (76). This file may include certain details regarding the results of packet scanning and/or the determination as to whether to allow or disallow the packet.

To communicate the details of the extracted file, control module 12 may include file data inside a memory buffer. Thus, control module 12 may remove an available memory buffer from the head of list 18 (78). As before, in the example of FIG. 3, control module 12 may access list 18 from one end (e.g., from the head of list 18), while packet processing module 14 may access list 18 from the opposite end (e.g., from the tail of list 18). After control module 12 has removed an available memory buffer from the head of list 18, it may store the file data within this memory buffer (80).

Subsequently, control module 12 may send a pointer, or reference, of this memory buffer to packet processing module 14 via a control message (82). Upon receipt of this pointer from control module 12 (83), packet processing module 14 may then extract the file data from the memory buffer (84) and process the data (86). For example, if the data indicates that the control module 12 has detected a virus within a packet previously received from user device 6, and that the packet has been disallowed, packet processing module 14 may be capable of sending a notification to user device 6 with an indication of such. Once packet processing module 14 has processed the data, it may add the memory buffer back to the free list 18 of available memory buffers (88). To do so, it may add the buffer to the tail end of list 18.

Figure 5A:
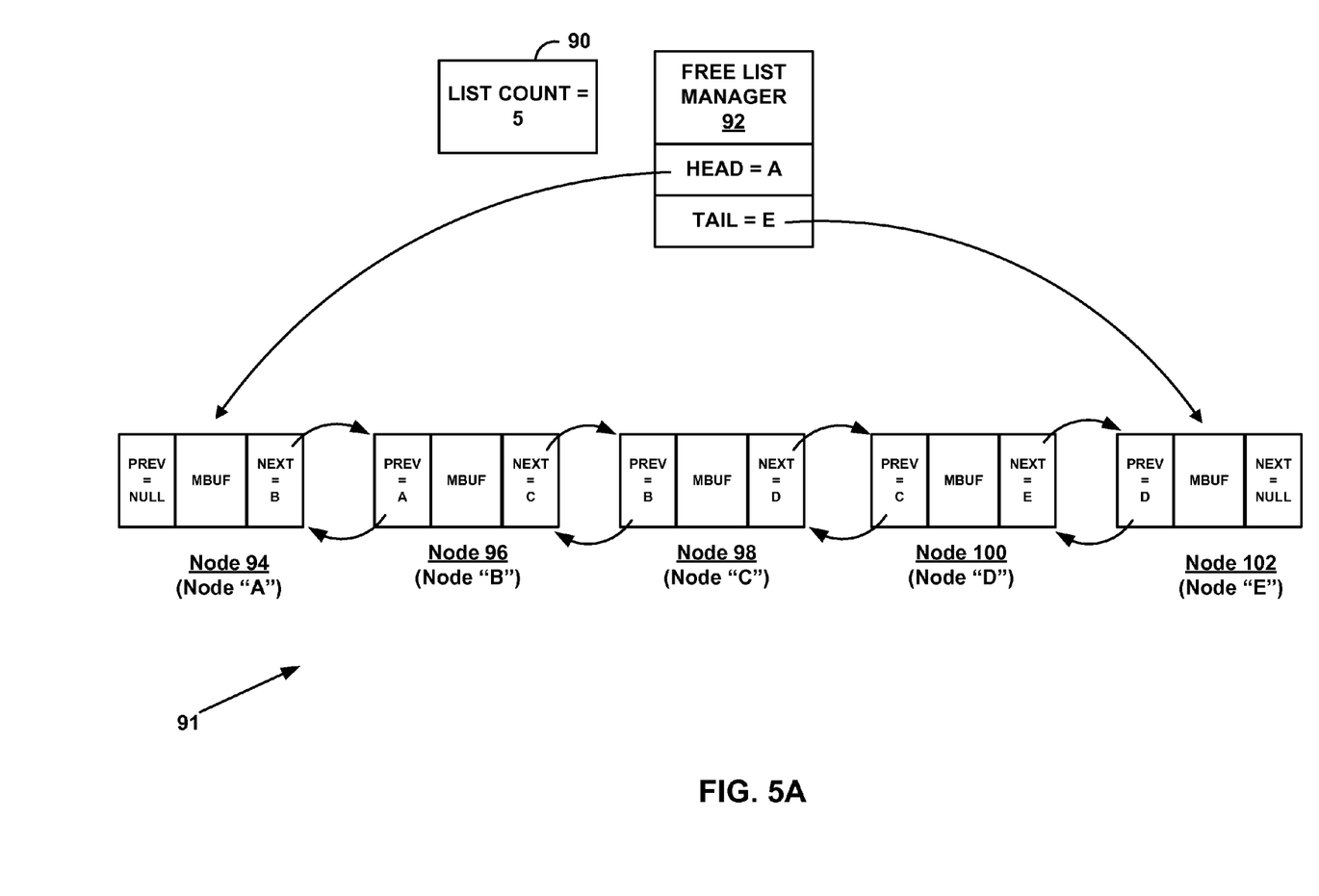
FIGS. 5A-5C are conceptual diagrams illustrating manipulation of a linked list of memory buffers, according to one embodiment.
Figure 5B:
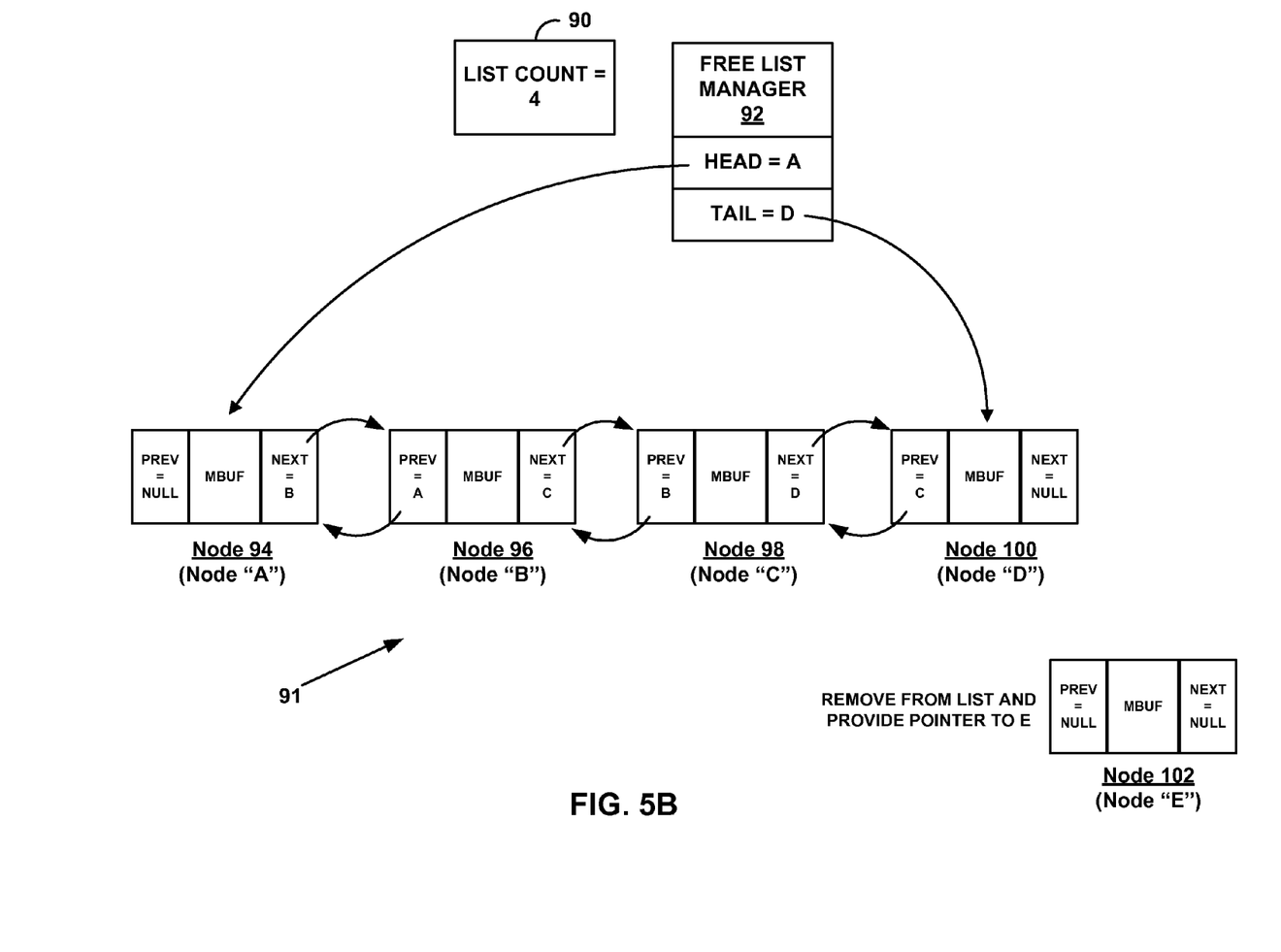
Figure 5C:
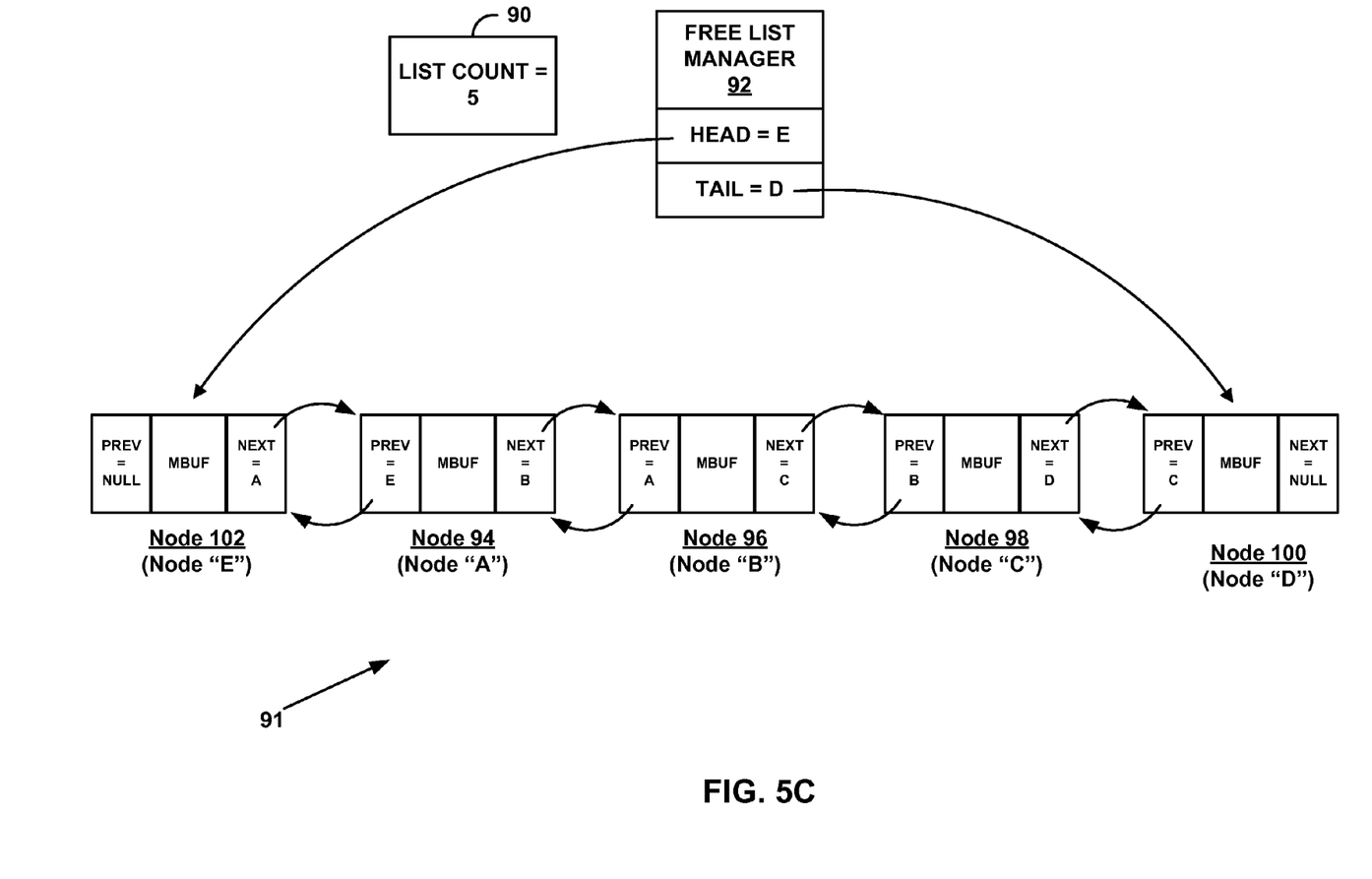

FIGS. 5A-5C are conceptual diagrams illustrating manipulation of a linked list 91 of memory buffers, according to one embodiment. The linked list 91 shown in FIGS. 5A-5C may be part of list 18 (FIG. 1), list 32 (FIG. 2), and/or list 46 (FIG. 2), according to various embodiments. Referring first to FIG. 5A, the linked list 91 includes nodes 94, 96, 98, 100, and 102. Node 94 is referred to as node "A," node 96 is referred to as node "B," node 98 is referred to as node "C," node 100 is referred to as node "D," and node 102 is referred to as node "E."

If linked list 91 is part of list 18, it may be initially allocated by network device 10 in memory of network device 10. If linked list 91 is part of list 32, it may be initially allocated by network device 24 in memory of network device 24. If linked list 91 is part of list 46, it may be initially allocated by network device 38 in memory of network device 38. For purposes of illustration only in the following description, it will be assumed that network device 10 has allocated linked list 91 for use by packet processing module 14 and control module 12.

Network device 10 may also allocate and utilize a list counter 90 and a list manager 92. In some embodiments, list counter 90 and list manager 92 may be implemented as global variables that are accessible (e.g., atomically, in some cases) by each of packet processing module 14 and control module 12. In some embodiments, list counter 90 and list manager 92 may be allocated by network device 10 as part of list 18. In these embodiments, list 18 includes linked list 91, list counter 90, and list manager 92.

List counter 90 maintains a count of the number of nodes included within linked list 91. In the example of FIG. 5A, list counter 90 indicates that five nodes are currently included within linked list 91. List manager 92 includes and maintains values corresponding to the head (i.e., one end) and the tail (i.e., second, opposite end) of linked list 91. These values may comprise pointers, or references, to the head and tail of linked list 91. In FIG. 5A, list manager 92 includes values that refer to node 94 (node "A") at the head of linked list 91, and that refer to node 102 (node "E") at the tail of linked list 91.

Each node 94, 96, 98, 100, and 102 may include an available memory buffer ("MBUF"). Once extracted from linked list 91, data may be written into the corresponding memory buffer of node 94, 96, 98, 100, or 102. In the embodiment of FIG. 5A, linked list 91 comprises a doubly linked list. Thus, each node 94, 96, 98, 100, and 102 further includes two pointers, or references: one pointer to a previous node in the linked list 91, and one pointer to a next node in the linked list 91. If a node, such as node 94, is the first node in linked list 91 (i.e., the head), the pointer to the previous node may be set equal to NULL, or zero. If a node, such as node 102, is the last node in the linked list 91 (i.e., the tail), the pointer to the next node may be set equal to NULL, or zero.

FIG. 5B is a conceptual diagram illustrating a removal of node 102 (node "E") from linked list 91. For example, packet processing module 14 may remove node 102 from linked list 91 if it has received an incoming packet, such as is described with reference to FIG. 3, and wishes to store the packet within a memory buffer. Packet processing module 14 may remove node 102 from linked list 91 and store the packet within the memory buffer contained within node 102. Packet processing module 14 may set, in node 102, the pointer to the previous node equal to NULL, or zero, since node 102 is no longer part of linked list 91. In addition, packet processing module 14 may provide the pointer, or reference, of node 102 to control module 12, such that control module 12 may access node 102. In some cases, packet processing module 14 may obtain the value of the pointer, or reference, to node 102 from list manager 92, which, as shown in FIG. 5A, had included the pointer to node 102 as the last node in linked list 91 prior to its removal. Node 100 may also be updated. The pointer of node 100 that points to the next node in linked list 91 may be set equal to NULL, since node 100 is now the last node in linked list 91.

After packet processing module 14 has removed node 102 from linked list 91, it may update the value of list counter 90 to indicate that linked list 91 now includes four nodes, rather than five. Packet processing module 14, or another component of network device 10, may also update list manager 92 to specify that node 100 (node "D") is now at the tail, or end, of linked list 91.

In some embodiments, prior to remove node 102 from linked list 91, packet processing module 14 may first check the value of list counter 90 and compare this value to a preserved, or minimum, value. The preserved value may be preconfigured or predefined within network device 10, such as by being set to a hard-coded value or to a value set by an administrator. The preserved value may indicate a minimum number of memory buffers, or nodes, that are to be included within linked list 91. If the value of list counter 90 exceeds this preserved value, then packet processing module 14 will proceed to remove node 102 from linked list 91, as described above. If, however, the value of list counter 90 equals or is less than the preserved value, packet processing module 14 may not immediately remove node 102 from linked list 91. Instead, packet processing module 14 may perform other activities until additional nodes have been added back to linked list 91, such that the list counter 90 exceeds the preserved value. In some cases, packet processing module 14 may periodically check the value of list counter 90 until it identifies a value that exceeds the preserved value, at which point packet processing module 14 may then remove node 102 from linked list 91. In some embodiments, the preserved value may be set equal to a value of three or four.

In some embodiments, packet processing module 14 may implement atomic operations when reading or updating the value of list counter 90. In these embodiments, each read or update operation may comprise an atomic operation to ensure the integrity of list counter 90. The atomic operations, or instructions, may be native to a particular machine architecture, such as the architecture of network device 10, and may be implemented at machine level. Although atomic operations may be used in these embodiments, they may typically be used for just one value, such as an integer value of list counter 90.

FIG. 5C is a conceptual diagram illustrating an addition of node 102 (node "E") back to the head, or front end, linked list 91. For example, control module 12 may add node 102 back to the head of linked list 91 after it has extracted a packet from the memory buffer contained within node 102, such as is described with reference to FIG. 3. For example, control module 12 may extract the packet from node 102 and store the packet in file system database 16 (FIG. 1). Control module 12 may set, in node 102, the pointer to the next node equal to the reference to node 94 (node "A"), since node 102 is now the first node in linked list 91. In some cases, control module 12 may obtain the value of the pointer, or reference, to node 94 from list manager 92, which, as shown in FIG. 5B, had previously included the pointer to node 94 as the first node in linked list 91 prior to the addition of node 102. Node 94 may also be updated. The pointer of node 94 that points to the previous node in linked list 91 may be set equal to the reference of node 102 (node "E"), given that node 102 is now the first item in linked list 91.

After control module 12 has added node 102 back to the head of linked list 91, it may update the value of list counter 90 to indicate that linked list 91 now again includes five nodes. Control module 12, or another component of network device 10, may also update list manager 92 to specify that node 102 is now at the head, or beginning, of linked list 91.

In some embodiments, control module 12 may implement atomic operations when reading or updating the value of list counter 90. In these embodiments, each read or update operation may comprise an atomic operation to ensure the integrity of list counter 90.

FIGS. 5A-5C demonstrate how multiple modules, or processes, within network device 100 may access linked list 91 over time without necessarily locking linked list 91. In the example where two modules 12 and 14 (e.g., two processes, two threads) access linked list 91, one module may manipulate one or more nodes from a first end of linked list 91, while the other module may manipulate one or more nodes from a second, opposite end of linked list 91, where each node includes a memory buffer.

In the examples of FIGS. 5A-5C, packet processing module 14 is capable of removing node 102 from a tail end of linked list 91, while control module 12 is capable of adding back node 102 to the head end of linked list 91. Of course, packet processing module 14 and control module 12 are capable of manipulating multiple nodes over the course of time. Packet processing module 14 is capable of both removing nodes from, and adding nodes back to, the tail end of linked list 91, while control module 12 is capable of removing nodes from, and adding nodes back to, the head (opposite) end of linked list 91. Because modules 12 and 14 are capable of manipulating nodes on opposite ends of linked list 91, neither module necessarily needs to lock linked list 91 prior to access, which may help improve performance.

Figure 6:
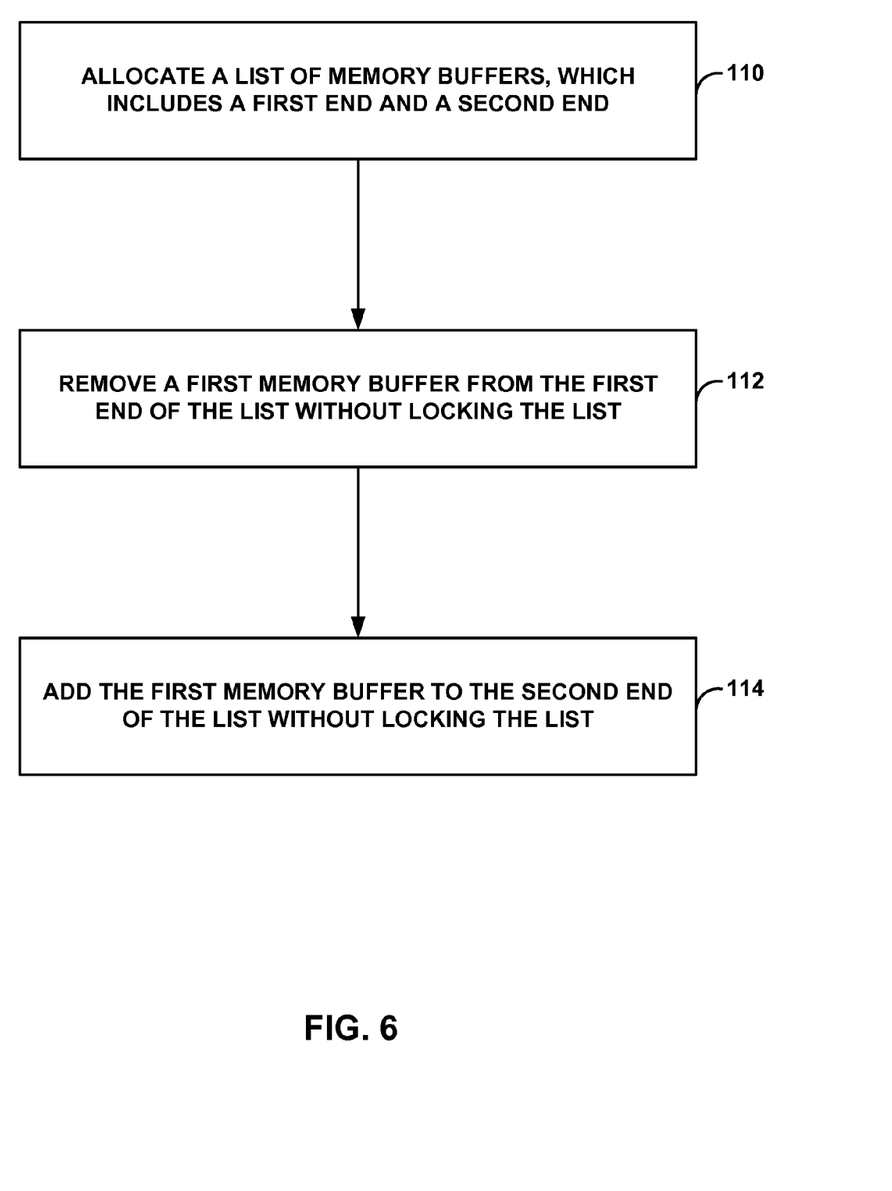
FIG. 6 is a flow diagram illustrating a method that may be performed by a network device, such as the network device shown in FIG. 1 or the network devices shown in FIG. 2, according to one embodiment.

FIG. 6 is a flow diagram illustrating a method that may be performed by a network device, such as network device 10 (FIG. 1), network device 24 (FIG. 2), and/or network device 38 (FIG. 2), according to one embodiment. For purposes of illustration only, it will be assumed in the description below that the method shown in FIG. 6 is performed by network device 10.

Network device 10 may allocate a list (such as linked list 91 shown in FIGS. 5A-5C) of memory buffers that are each available for use by multiple modules executed within network device 10, such as packet processing module 14 and control module 12 (110). The list includes a first end and a second, opposite end. For example, the first end of the list may comprise a start of the list, and the second end of the list may comprise an end of the list. In some embodiments, the list may comprise a plurality of nodes, wherein each node of the list includes one memory buffer. The first end and second end of the list may each comprise one node.

In some embodiments, the list may comprise a doubly-linked list, such that each node of the linked list further includes a first element and a second element. The first element refers to a previous node in the linked list, and the second element refers to a next node in the linked list. The first and second elements may each comprise a node pointer, or a reference.

A first module of the multiple modules, such as packet processing module 14, may remove a first memory buffer from the first end of the list by without locking the linked list (112). After the first module has removed the first memory buffer from the list, it may store data within the first memory buffer, and provide an indication that the data is stored within the first memory buffer. For example, if packet processing module 14 has received a packet from an external device (e.g., user device 6 or 8), it may store the packet within the first memory buffer, and then provide an indication, such as a control message, to the control module 12 that the packet is stored in the first memory buffer. This control message may include a pointer, or reference, to the first memory buffer, so that the control module may readily and quickly locate the first memory buffer.

In some cases, a second, different module of the multiple modules, such as control module 12, may extracting the data, such as the packet, from the first memory buffer. Control module 12 may then scan the extracted data for one or more viruses, and provide an indication as to whether the extracted data is infected with the one or more viruses. Control module 12 may also provide an indication as to whether to allow or disallow subsequent data that is received from the external device (e.g., user device 6 or 8) that originally sent the data to network device 10. The first and second modules may, in some cases, each comprise a process or a thread of execution.

When the second module has extracted the data from the first memory buffer, it may add the first memory buffer to the second end of the list without locking the list. In some cases, the second module (e.g., control module 12) may also remove a second memory buffer from the second end of the list without locking the list. For example, as described in reference to FIG. 4, control module 12 may extract a file from file system database 16, and wish to store this file within a memory buffer, such as the second memory buffer. Control module 12 may then send a pointer, or reference, to this second memory buffer to packet processing module 14 via a control message, such that packet processing module 14 may locate the second memory buffer and extract the file. Upon extraction, packet processing module 14 (i.e., the first module, in this example) may then add the second memory buffer to the first end of the list without locking the list.

In some embodiments, any two selected modules of multiple modules that may be contained within network device 10, such as control module 12 and packet processing module 14, are capable of accessing the list. In these embodiments, any other modules besides these selected two modules within network device 10 do not have access to the list.

In some embodiments, network device 10 may maintain a counter value, such as a value of list counter 90 shown in FIGS. 5A-5C, that specifies a number of memory buffers that are currently included within the list. In some cases, the first and/or second modules of network device 10 (e.g., packet processing module 14 and/or control module 12) may perform an atomic operation to read or update the counter value.

In some embodiments, the first and/or second module of network device 10 may compare the counter value to a predetermined threshold (e.g., a preserved value). The first and/or second modules may remove a memory buffer from the list after determining that the counter value exceeds the predetermined threshold. For example, the first module may remove the first memory buffer from the first end of the list after determining that the counter value exceeds the preserved value.

In some embodiments, both the first module and the second module (e.g., control module 12 and packet processing module 14) are capable of simultaneously accessing the linked list without locking the list. In these embodiments, locking of the list may not be necessary, because the first module manipulates only the first end of the list, while the second module manipulates only the second, opposite end of the list. In some cases, the first and second modules may simultaneously access the linked list only when the number of memory buffers in the list exceeds a preserved, or predetermined, value.

Figure 7:
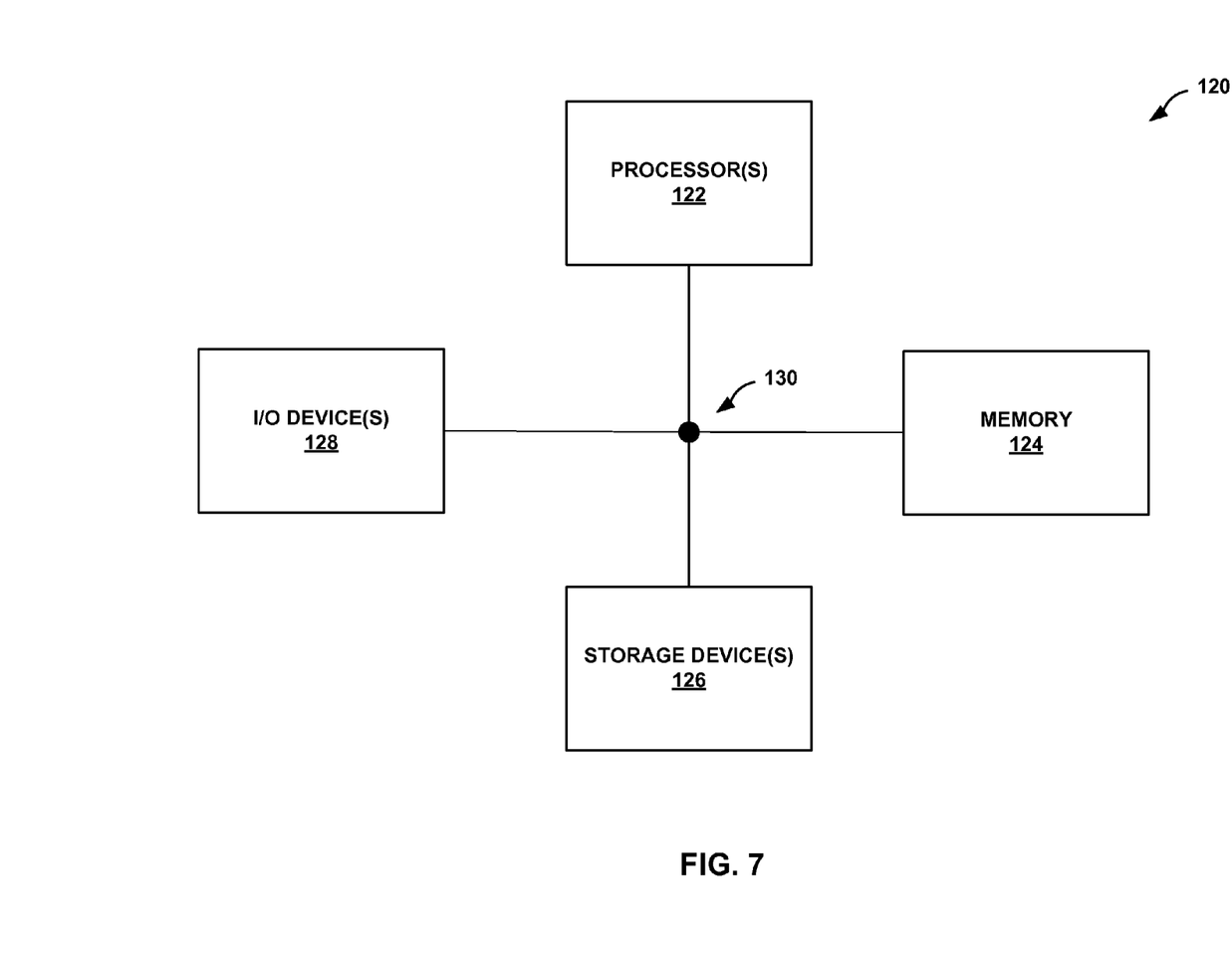
FIG. 7 is a block diagram illustrating a computing system that may be included within any of the network devices shown in FIGS. 1 and 2, according to one embodiment.

FIG. 7 is a block diagram illustrating a computing system 120 that may be included within any of network device 10 (FIG. 1), network device 24 (FIG. 2), and/or network device 38 (FIG. 2), according to one embodiment. Computing system 120 includes one or more processors 122, memory 124, one or more storage devices 126, and one or more input/output device 128.

Processors 122 may include a general purpose microprocessor, a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure suitable for implementation of the techniques described herein. Processors 122 are capable of executing one or more instructions that are stored within memory 124 to implement any of the techniques described herein.

Memory 124, which comprises one or more computer-readable storage media, can include random-access memory (RAM), read-only memory (ROM), Electrically Erasable Programmable ROM (EEPROM), or any other form of fixed or removable storage medium that can be used to carry or store desired program code in the form of instructions or data structures and that can be accessed by a computer. Computing system 120 may further include one or more additional storage devices 126, including fixed or removable storage devices. Storage devices 126 may comprise a Compact Disc ROM (CD-ROM) or other optical disk storage, laser disc, digital versatile disc (DVD), floppy disk, magnetic disk storage or other magnetic storage devices, or any other medium that can be used to carry or store desired program code in the form of instructions or data structures and that can be accessed by a computer.

Computing system 120 may further include one or more input/output devices 128. Input/output devices 128 may, for example, include a keyboard, a mouse, a trackball, a display device (e.g., monitor), a printer, a microphone, speakers, and the like. Input/output devices 128, processors 122, memory 124, and storage devices 126 may be interconnected by one or more connections 130, which may include wired connections and/or wireless connections. For example, in one scenario, connections 130 may include a bus.

In one or more example embodiments, the functions described above may be implemented in hardware, software, firmware, or any combination thereof. If implemented in software, the functions may be stored on or transmitted over as one or more instructions or code on a computer-readable medium that may be executed by one or more processors, such as the one or more processors 122 that may be included within any of network device 10 (FIG. 1), network device 24 (FIG. 2), and/or network device 38 (FIG. 2). Computer-readable media includes both computer storage media and communication media including any medium that facilitates transfer of a computer program from one place to another. A storage media may be any available media that can be accessed by a computer. By way of example, and not limitation, such computer-readable media can comprise random-access memory (RAM), read-only memory (ROM), Electrically Erasable Programmable ROM (EEPROM), Compact Disc ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk. Combinations of the above should also be included within the scope of computer-readable media.

Various embodiments of the invention have been described. These and other embodiments are within the scope of the following claims.

The invention claimed is:

1. A method comprising:
    allocating a list of memory buffers that are each available for use by multiple modules executed within a network device, wherein the list includes a first end and a second, opposite end;
    removing a first memory buffer from the first end of the list by a first module of the multiple modules without locking the list, wherein the first module manipulates memory buffers only on the first end of the list and is further configured to add memory buffers to the first end of the list without locking the list;
    storing, by the first module of the multiple modules, data in the first memory buffer;
    extracting, by a second module of the multiple modules, the data stored in the first memory buffer; and
    after extracting the data stored in the first memory buffer, adding the first memory buffer to the second end of the list by the second module of the multiple modules without locking the list, wherein the second module manipulates memory buffers only on the second end of the list and is further configured to remove memory buffers from the second end of the list without locking the list.

2. The method of claim 1, wherein the first end of the list comprises a start of the list, and wherein the second end of the list comprises an end of the list.

3. The method of claim 1, wherein the list comprises a plurality of nodes, wherein each node of the list includes one memory buffer that is available for use by the multiple modules, and wherein the first end and second end of the list each comprise one node.

4. The method of claim 3, wherein the list comprises a doubly linked list, such that each node of the doubly linked list further includes a first element and a second element, the first element referring to a previous node in the doubly linked list and the second element referring to a next node in the doubly linked list.

5. The method of claim 1, further comprising:
    removing a second memory buffer from the second end of the list by the second module of the multiple modules without locking the list;
    storing, by the second module of the multiple modules, data in the second memory buffer;
    extracting, by the first module of the multiple modules, the data stored in the second memory buffer; and
    after extracting the data stored in the second memory buffer, adding the second memory buffer to the first end of the list by the first module of the multiple modules without locking the list.

6. The method of claim 1, wherein the first and second modules each comprise a process.

7. The method of claim 1, further comprising:
    providing an indication that the data is stored in the first memory buffer.

8. The method of claim 7, further comprising:
    scanning the extracted data for one or more viruses; and
    providing an indication as to whether the extracted data is infected with the one or more viruses.

9. The method of claim 1, further comprising:
    receiving the data from an external device prior to storing the data in the first memory buffer;
    scanning the extracted data; and
    upon scanning, providing an indication as to whether to allow or disallow subsequent data that is received from the external device.

10. The method of claim 1, further comprising:
    maintaining a counter value that specifies a number of memory buffers that are currently included within the list.

11. The method of claim 10, further comprising:
    performing an atomic operation to read or update the counter value.

12. The method of claim 10, further comprising comparing the counter value to a predetermined threshold, and wherein removing the first memory buffer comprises removing the first memory buffer from the first end of the list after determining that the counter value exceeds the predetermined threshold.

13. The method of claim 1, wherein the first module and the second module simultaneously access the list without locking the list.

14. A non-transitory computer-readable medium comprising instructions that cause one or more processors to:
    allocate a list of memory buffers that are each available for use by multiple modules executed within a network device, wherein the list includes a first end and a second, opposite end;

remove a first memory buffer from the first end of the list by a first module of the multiple modules without locking the list, wherein the first module manipulates memory buffers only on the first end of the list and is further configured to add memory buffers to the first end of the list without locking the list;

store, by the first module of the multiple modules, data in the first memory buffer;

extract, by a second module of the multiple modules, the data stored in the first memory buffer; and after extracting the data stored in the first memory buffer, add the first memory buffer to the second end of the list by the second module of the multiple modules without locking the list, wherein the second module manipulates memory buffers only on the second end of the list and is further configured to remove memory buffers from the second end of the list without locking the list.

15. A network device comprising:

a memory configured to store a pre-allocated list of memory buffers that are each available for use by multiple modules of the network device, wherein the list includes a first end and a second, opposite end;

a first module of the multiple modules configured to remove a first memory buffer from the first end of the list without locking the list, and further configured to store data in the first memory buffer, wherein the first module manipulates memory buffers only on the first end of the list and is further configured to add memory buffers to the first end of the list without locking the list; and a second module of the multiple modules configured to extract the data stored in the first memory buffer, and further configured to add the first memory buffer to the second end of the list, without locking the list, after extracting the data stored in the first memory buffer, wherein the second module manipulates memory buffers only on the second end of the list and is further configured to remove memory buffers from the second end of the list without locking the list.

16. The network device of claim 15, wherein the first end of the list comprises a start of the list, and wherein the second end of the list comprises an end of the list.

17. The network device of claim 15, wherein the list comprises a plurality of nodes, wherein each node of the list includes one memory buffer that is available for use by the multiple modules, and wherein the first end and second end of the list each comprise one node.

18. The network device of claim 17, wherein the list comprises a doubly linked list, such that each node of the doubly linked list further includes a first element and a second element, the first element referring to a previous node in the doubly linked list and the second element referring to a next node in the doubly linked list.

19. The network device of claim 16, wherein:

the second module is further configured to remove a second memory buffer from the second end of the list without locking the list, and to store data in the second memory buffer; and the first module is further configured to extract the data stored in the second memory buffer, and to add the second memory buffer to the first end of the list, without locking the list, after extracting the data stored in the second memory buffer.

20. The network device of claim 16, wherein the first and second modules each comprise a process.

21. The network device of claim 16, wherein:

the first module is further configured provide an indication that the data is stored within the first memory buffer.

22. The network device of claim 21, further comprising:

a third module configured to scan the extracted data for one or more viruses, and provide an indication as to whether the extracted data is infected with the one or more viruses.

23. The network device of claim 16, wherein:

the first module is further configured to receive the data from an external device prior to storing the data in the first memory buffer; and the network device further comprises a third module configured to scan the extracted data and, upon scanning, provide an indication as to whether to allow or disallow subsequent data that is received from the external device.

24. The network device of claim 16, wherein the first and second modules are further configured to maintain a counter value that specifies a number of memory buffers that are currently included within the list.

25. The network device of claim 24, wherein the first and second modules are configured to perform one or more atomic operations to read or update the counter value.

26. The network device of claim 24, wherein the first module is further configured to compare the counter value to a predetermined threshold, such that the first module removes the first memory buffer from the first end of the list after determining that the counter value exceeds the predetermined threshold.

27. The network device of claim 15, wherein the first module and the second module are configured to simultaneously access the list without locking the list.

28. A network device comprising:

means for allocating a list of memory buffers that are each available for use by multiple modules executed within a network device, wherein the list includes a first end and a second, opposite end;

means for removing a first memory buffer from the first end of the list by a first module of the multiple modules without locking the list, wherein the first module manipulates memory buffers only on the first end of the list and is further configured to add memory buffers to the first end of the list without locking the list;

means for storing, by the first module of the multiple modules, data in the first memory buffer;

means for extracting, by a second module of the multiple modules, the data stored in the first memory buffer; and means for adding the first memory buffer to the second end of the list by a second module of the multiple modules, without locking the list, after the data stored in the first memory buffer is extracted, wherein the second module manipulates memory buffers only on the second end of the list and is further configured to remove memory buffers from the second end of the list without locking the list.

* * * * *

UNITED STATES PATENT AND TRADEMARK OFFICE
CERTIFICATE OF CORRECTION

PATENT NO. : 8,526,326 B1
APPLICATION NO. : 12/199556
DATED : September 3, 2013
INVENTOR(S) : Monty S. Gill and Yi Sun It is certified that error appears in the above-identified patent and that said Letters Patent is hereby corrected as shown below:

Column 13, Line 53 (Claim 19): Replace "claim 16," with --claim 15,--
Column 14, Line 1 (Claim 20): Replace "claim 16," with --claim 15,--
Column 14, Line 3 (Claim 21): Replace "claim 16," with --claim 15,--
Column 14, Line 11 (Claim 23): Replace "claim 16," with --claim 15,--
Column 14, Line 20 (Claim 24): Replace "claim 16," with --claim 15,--

Signed and Sealed this
Twentieth Day of February, 2018

Andrei Iancu
*Director of the United States Patent and Trademark Office*